(12) United States Patent
Umeda et al.

(10) Patent No.: US 10,944,307 B2
(45) Date of Patent: Mar. 9, 2021

(54) ROTARY ELECTRIC MACHINE, GENERATOR, AND WIND TURBINE POWER GENERATION FACILITY

(71) Applicant: MITSUBISHI HEAVY INDUSTRIES, LTD., Tokyo (JP)

(72) Inventors: Akihiko Umeda, Tokyo (JP); Mikito Sasaki, Tokyo (JP); Shin Asano, Tokyo (JP); Hiroshi Sato, Tokyo (JP); Hisanobu Shinoda, Tokyo (JP); Shinichi Isobe, Tokyo (JP); Atsushi Yuge, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/676,581

(22) Filed: Nov. 7, 2019

(65) Prior Publication Data
US 2020/0266681 A1    Aug. 20, 2020

(30) Foreign Application Priority Data

Feb. 20, 2019   (JP) .............................. JP2019-028459

(51) Int. Cl.
*H02K 7/00* (2006.01)
*F03D 9/25* (2016.01)
(Continued)

(52) U.S. Cl.
CPC .............. *H02K 7/003* (2013.01); *F03D 9/25* (2016.05); *H02K 7/183* (2013.01); *H02K 49/102* (2013.01); *F16D 3/06* (2013.01); *F16D 3/12* (2013.01)

(58) Field of Classification Search
CPC ...... H02K 7/003; H02K 49/102; H02K 7/183; F03D 9/25; F16D 3/06; F16D 3/12
(Continued)

(56) References Cited

U.S. PATENT DOCUMENTS 7,154,191 B2 *  12/2006  Jansen ..................... H02K 5/20
                                                          290/55
7,154,193 B2 *  12/2006  Jansen ................. H02K 7/1838
                                                          290/55
(Continued)

FOREIGN PATENT DOCUMENTS

DE    10 2014 201 465    7/2015
JP       2003-336571    11/2003
(Continued)

OTHER PUBLICATIONS

Extended European Search Report dated May 29, 2020 in corresponding European Patent Application No. 19211747.1.

*Primary Examiner* — Charles Reid, Jr.
(74) *Attorney, Agent, or Firm* — Wenderoth, Lind & Ponack, L.L.P.

(57) ABSTRACT

A rotary electric machine includes an armature unit including an annular rotor configured to be rotatable around an axis and a stator disposed on a radially outer side of the annular rotor; an input or output shaft coupled at a first end thereof to an external device and extending along an axial direction of the annular rotor in a central space defined in a central portion of the annular rotor; and a coupling device disposed closer to a second end of the input or output shaft than an end of the annular rotor adjacent to the external device in the axial direction of the annular rotor and connecting the input or output shaft and the annular rotor so as to be able to transmit a torque.

6 Claims, 6 Drawing Sheets

(51) Int. Cl.
   *H02K 7/18*   (2006.01)
   *H02K 49/10*  (2006.01)
   *F16D 3/06*   (2006.01)
   *F16D 3/12*   (2006.01)

(58) Field of Classification Search
   USPC .................................................. 290/55, 44
   See application file for complete search history.

(56) References Cited

U.S. PATENT DOCUMENTS

| | | |
|---|---|---|
| 7,683,515 B2 | 3/2010 | Leiber et al. |
| 2005/0280264 A1 | 12/2005 | Nagy |
| 2006/0087123 A1* | 4/2006 | Stout ........................ F02C 7/268 |
| | | 290/2 |
| 2007/0132247 A1* | 6/2007 | Galayda ................ F03D 7/0224 |
| | | 290/44 |
| 2007/0186692 A1 | 8/2007 | Waszak et al. |
| 2010/0079016 A1* | 4/2010 | Hemmelmann ......... H02K 9/22 |
| | | 310/54 |
| 2011/0285132 A1* | 11/2011 | Waszak .................. H02K 16/04 |
| | | 290/52 |
| 2012/0274075 A1* | 11/2012 | Kroger .................... F03D 15/10 |
| | | 290/55 |
| 2013/0038065 A1 | 2/2013 | Versteeg |
| 2013/0292950 A1* | 11/2013 | Ritschel .................... F03D 9/25 |
| | | 290/55 |
| 2014/0008915 A1* | 1/2014 | Ribarov .................. F03D 15/20 |
| | | 290/55 |
| 2014/0125064 A1* | 5/2014 | Hofmann ............. H02K 7/1838 |
| | | 290/55 |
| 2015/0159628 A1* | 6/2015 | Appa ........................ F03D 1/04 |
| | | 290/55 |
| 2016/0061190 A1* | 3/2016 | Deicke ................... H02K 7/116 |
| | | 290/55 |
| 2016/0172934 A1* | 6/2016 | Appa ..................... H02K 7/183 |
| | | 290/55 |
| 2017/0204837 A1 | 7/2017 | Hartmann |

FOREIGN PATENT DOCUMENTS

| | | |
|---|---|---|
| JP | 5526219 | 6/2014 |
| WO | 2015/075456 | 5/2015 |

* cited by examiner

ROTARY ELECTRIC MACHINE, GENERATOR, AND WIND TURBINE POWER GENERATION FACILITY

TECHNICAL FIELD

The present disclosure relates to a rotary electric machine, a generator, and a wind turbine power generation facility.

BACKGROUND ART

Rotary electric machines such as generators and electric motors are conventionally known. For instance, JP 2003-336571 A discloses a configuration in which rotary electric machines as generators are arranged in series via a clutch in the axial direction of a torque input shaft to increase the power generation capacity.

SUMMARY

Incidentally, in the case where multiple generators are coupled in series as in JP 2003-336571 A, since a large torque including torque for driving downstream generators is input to upstream generators, the upstream generators require a higher strength than the downstream generators. Accordingly, taking into consideration the load on the upstream generators, some restriction may be imposed on the downstream generators, for instance, downsizing as compared to the upstream generators. As a result, compared with the case of using generators with the same capacity in the same space in the axial direction, the power generation capacity cannot be sufficiently increased, and it cannot respond to a demand for increasing the power generation capacity. Further, the input shaft may be largely displaced by wind load. To absorb such displacement, space is required for a coupling to prevent the generators from being largely displaced while maintaining the flexibility of the input shaft.

In this regard, JP 2003-336571 A does not disclose knowledge to accomplish both the increase in capacity and the improvement in durability of the device without upsizing the device.

In view of the above, an object of at least one embodiment of the present invention is to provide a rotary electric machine that can accomplish both the increase in generation of power or torque and the improvement in durability of the device without upsizing the device.

(1) A rotary electric machine according to at least one embodiment of the present invention comprises: an armature unit including an annular rotor configured to be rotatable around an axis and a stator disposed on a radially outer side of the rotor; an input/output shaft coupled at a first end to an external device and extending along an axial direction of the rotor in a central space formed in a central portion of the rotor; and a coupling device disposed closer to a second end of the input/output shaft than an end of the rotor adjacent to the external device is in the axial direction and connecting the input/output shaft and the rotor so as to be able to transmit a torque.

With the above configuration (1), since the input/output shaft for transmitting a torque to the rotor via the coupling device extends in the central space of the rotor along the axial direction, it is possible to make use of the central space of the rotor in an extension range of the rotor in the axial direction. Thus, it is possible to reduce the size of the rotary electric machine in the axial direction, and it is possible to generate a larger electric power or a larger torque when the same space in the axial direction is used.

Further, since the input/output shaft and the rotor are coupled by the coupling device at a position farther away from the external device than the end of the rotor adjacent to the external device toward the second end of the input/output shaft in the axial direction, it is possible to secure a long span of the input/output shaft, i.e., a long distance from the external device to the coupling device, compared with the case where the input/output shaft and the rotor are coupled at a position closer to the external device than the end of the rotor adjacent to the external device is, for instance. Thus, even if the external device is displaced, misalignment angle of the input/output shaft in the coupling device is reduced. Thus, it is possible to provide the rotary electric machine with an improved robust against the displacement of the external device.

Accordingly, it is possible to accomplish both the increase in generation of power or torque and the improvement in durability of the device without upsizing the device.

(2) In some embodiments, in the above configuration (1), the coupling device may connect the second end of the input/output shaft and the rotor so as to be able to transmit a torque.

With the above configuration (2), since the dimension of the input/output shaft in the axial direction, i.e., the distance from the external device to the coupling device is secured long, when the external device is displaced, it is possible to reduce misalignment angle of the input/output shaft in the coupling device, compared with the case where the input/output shaft and the rotor are coupled at a position closer to the external device than the end of the rotor adjacent to the external device is.

(3) In some embodiments, in the above configuration (1) or (2), the armature unit may include a first armature unit and a second armature unit arranged in the axial direction.

With the above configuration (3), since the rotary electric machine includes a plurality of armature units (e.g., first armature unit and second armature unit) arranged along the axial direction, it is possible to increase the output of the rotary electric machine without upsizing in the radial direction.

(4) In some embodiments, in the above configuration (3), the second armature unit may be disposed farther away from the external device than the first armature unit in the axial direction, the input/output shaft may extend so as to traverse the central space of the rotor of the first armature unit and the central space of the rotor of the second armature unit, and the coupling device may include: a first coupling connecting the second end of the input/output shaft and the rotor of the second armature unit; and a second coupling connecting the rotor of the first armature unit and the rotor of the second armature unit.

With the above configuration (4), since the dimension of the input/output shaft in the axial direction is secured long, it is possible to significantly reduce misalignment angle of the input/output shaft in the coupling device.

(5) In some embodiments, in the above configuration (3), the second armature unit may be disposed farther away from the external device than the first armature unit in the axial direction, the rotary electric machine may include a hollow shaft disposed outside the input/output shaft and inside the rotor in a radial direction of the input/output shaft, the input/output shaft and the hollow shaft may together extend so as to traverse the central space of the rotor of the first armature unit and the central space of the rotor of the second armature unit, and the coupling device may include: a third coupling connecting the second end of the input/output shaft and the hollow shaft; a fourth coupling connecting the rotor of the first armature unit and the hollow shaft; and a fifth coupling connecting the rotor of the second armature unit and the hollow shaft.

With the above configuration (5), since the second end of the input/output shaft and the hollow shaft are coupled by the third coupling, it is possible to secure a long dimension of the input/output shaft in the axial direction, and it is possible to reduce misalignment angle of the input/output shaft in the coupling device. Further, since the rotor of the first armature unit and the rotor of the second armature are individually coupled with the hollow shaft by the plurality of fourth couplings, it is possible to equalize the torque transmitted between each rotor and the hollow shaft.

(6) In some embodiments, in the above configuration (3), the second armature unit may be disposed farther away from the external device than the first armature unit in the axial direction, the input/output shaft may extend so as to traverse the central space of the rotor of the first armature unit and the central space of the rotor of the second armature unit, and the coupling device may include: a sixth coupling connecting the rotor of the first armature unit and the input/output shaft; and a seventh coupling connecting the rotor of the second armature unit and the input/output shaft.

With the above configuration (6), it is possible to equalize the torque transmitted to each rotor in a configuration including a necessary number of armature units for producing desired output.

(7) In some embodiments, in any one of the above configurations (1) to (6), the rotor may include: a low-speed rotor including an inner ring portion, an outer ring portion disposed on a radially outer side of the inner ring portion, and a radially extending portion connecting the inner ring portion and the outer ring portion; and an annular high-speed rotor disposed between the inner ring portion and the outer ring portion and rotatable around the axis independently from the low-speed rotor.

With the above configuration (7), since the high-speed rotor is disposed inside the low-speed rotor, it is possible to provide the rotary electric machine (for instance, a so-called magnetic geared generator in the case where the rotary electric machine functions as the generator) that can produce a higher output than the rotary electric machine not having the high-speed rotor. Thus, it is possible to provide the rotary electric machine that can suppress upsizing in the axial direction and/or the radial direction for a higher output, and can achieve downsizing for an equivalent output, compared with the rotary electric machine not having the high-speed rotor.

(8) A generator according to at least one embodiment of the present invention comprises: an armature unit including an annular rotor configured to be rotatable around an axis and a stator disposed on a radially outer side of the rotor; an input shaft coupled at a first end to a torque generating part and extending along an axial direction of the rotor in a central space formed in a central portion of the rotor; and a coupling device disposed farther away from the torque generating part than an end of the rotor adjacent to the torque generating part in the axial direction and connecting the input shaft and the rotor so as to be able to transmit a torque.

With the above configuration (8), since the coupling device for transmitting a torque from the rotor to the input shaft is disposed on the input shaft extending along the axial direction in the central space of the rotor, it is possible to make use of a space inside the rotor in an extension range of the rotor in the axial direction. Thus, it is possible to reduce the size of the generator in the axial direction. Further, since the input shaft and the rotor are coupled by the coupling device at a position farther away from the torque generating part than the end of the rotor adjacent to the torque generating part in the axial direction, it is possible to secure a long span of the input shaft, i.e., a long distance from the torque generating part to the coupling device, compared with the case where the input shaft and the rotor are coupled at a position closer to the torque generating part than the end of the rotor adjacent to the torque generating part is, for instance. Thus, even if the torque generating part is displaced, misalignment angle of the input shaft in the coupling device is reduced. Thus, it is possible to provide the generator with an improved robust against the displacement of the torque generating part.

(9) A wind turbine power generation facility according to at least one embodiment of the present invention comprises: the rotary electric machine described in any one of the above (1) to (7); and a wind turbine rotor configured to impart a rotational force to the rotary electric machine.

With the above configuration (9), it is possible to provide the wind turbine power generation facility having the effect described in any one of the above (1) to (7).

According to at least one embodiment of the present invention, it is possible to provide a rotary electric machine that can accomplish both the increase in generation of power or torque and the improvement in durability without upsizing the device.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
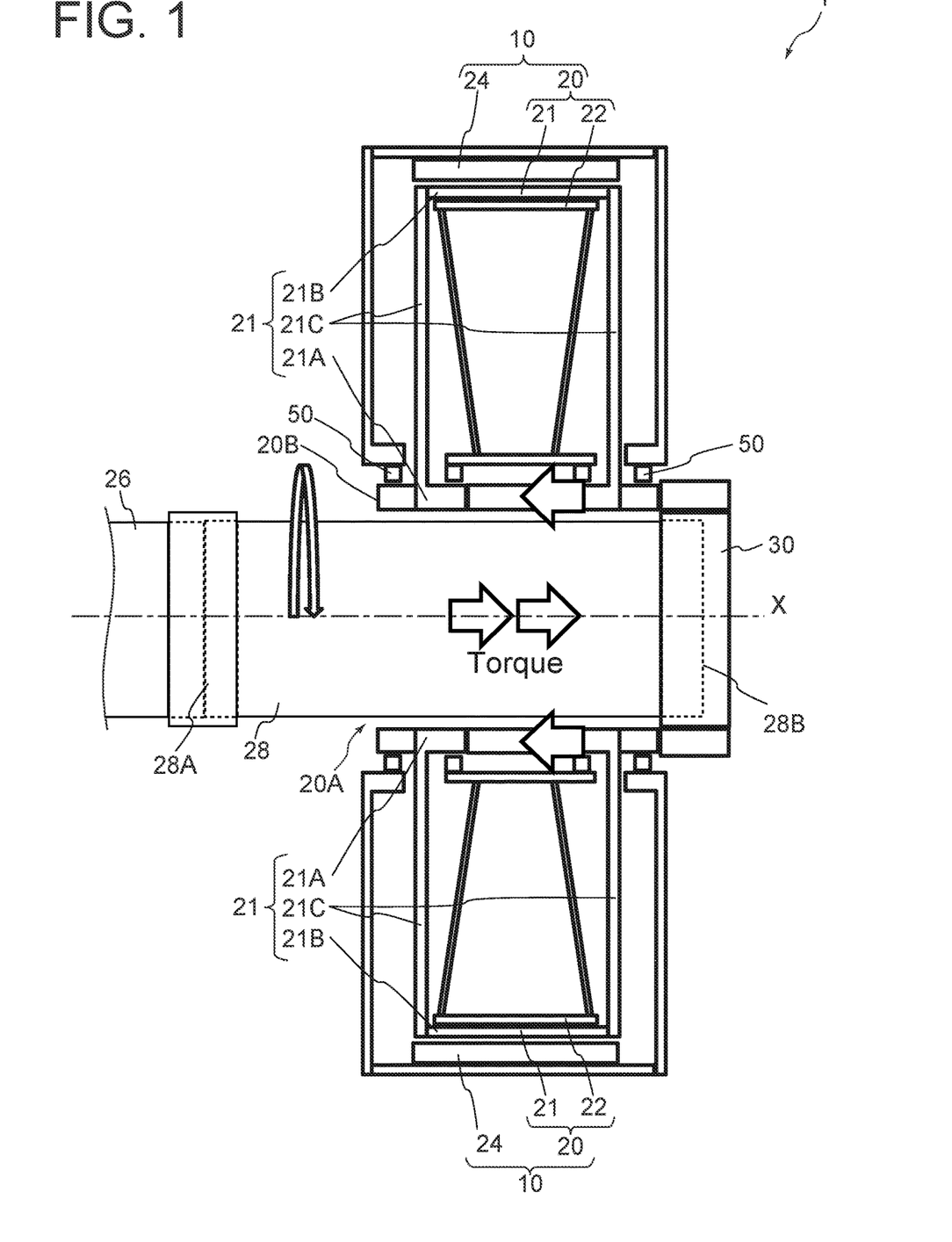
FIG. 1 is a cross-sectional side view schematically showing a configuration of a rotary electric machine according to an embodiment of the present invention.

FIG. 1 is a cross-sectional side view schematically showing a configuration of a rotary electric machine 1 according to an embodiment of the present invention. As illustrated in FIG. 1, the rotary electric machine 1 includes an armature unit 10 including an annular rotor 20 configured to be rotatable around the axis X and a stator 24 disposed on the radially outer side of the rotor 20, an input/output shaft 28 coupled at a first end 28A to an external device 26 and extending along the axial direction of the rotor 20 in a central space 20A formed in a central portion of the rotor 20, and a coupling device 30 disposed closer to a second end of the input/output shaft 28 than an end 20B of the rotor 20 adjacent to the external device 26 in the axial direction is (i.e., farther away from the external device 26 than the end 20B of the rotor 20) and connecting the input/output shaft 28 and the rotor 20 so as to be able to transmit a torque. Further, the rotary electric machine 1 includes a magnetic field generating part, i.e., a field system for generating a magnetic field through which an armature (not shown) of the armature unit 10 passes during relative rotation between the rotor 20 and the stator 24.

The rotary electric machine 1 is an electric machine having the rotor 20, which is a rotating part, and can function as a generator or an electric motor. The rotary electric machine 1 functioning as the generator coverts mechanical energy into electrical energy. The rotary electric machine 1 functioning as the electric motor coverts electrical energy into mechanical energy.

In FIG. 1 and FIGS. 2 to 5 described later, for simplicity of description, the direction of torque transmission when the rotary electric machine 1 functions as the generator is shown by the arrows. However, the rotary electric machine 1 is not limited to the generator. That is, when the rotary electric machine 1 functions as the electric motor, since the direction of torque transmission is opposite, the arrows shown in FIGS. 1 to 5 should be interpreted oppositely.

One of the rotor 20 or the stator 24 of the armature unit 10 includes an armature. The armature electromagnetically interacts with a magnetic field by rotation relative to a field system disposed on the other of the rotor 20 or the stator 24 and induces an electromotive force in the winding of the armature or applies a current to the winding to generate a torque for rotational movement with respect to the field system. In the case of a direct-current machine, the armature may be on the rotor 20, and in the case of a synchronous machine, the armature may be on the stator 24. The number of armature units 10 included in the rotary electric machine 1 may be one (see FIG. 1), or may be two or more.

When the rotary electric machine 1 functions as the generator, the input/output shaft 28 functions as an input shaft for transmitting a torque input from the external device 26 to the rotor 20. In contrast, when the rotary electric machine 1 functions as the electric motor, the input/output shaft 28 functions as an output shaft for transmitting a torque of the rotor 20 generated by electromagnetic interaction between the field system and the armature to the external device 26. The input/output shaft 28 may be solid cylindrical or hollow cylindrical. When the input/output shaft 28 is solid cylindrical or hollow cylindrical, the input/output shaft 28 is formed with an outer diameter that allows the input/output shaft 28 to be displaced in the central space 20A of the rotor 20. In other words, a gap may be formed between the outer peripheral surface of the input/output shaft 28 and the inner peripheral surface of the rotor 20 (and/or the stator 24) to provide a predetermined clearance.

Such an input/output shaft 28 may pass through the central space 20A of the rotor 20 in the axis X direction, and a second end 28B of the input/output shaft 28 may be aligned with or protrude from an end of the rotor 20 opposite to the end 20B. Alternatively, the input/output shaft 28 may be disposed so that the second end 28B thereof is positioned inside the central space 20A of the rotor 20.

Further, when the rotary electric machine 1 functions as the generator, the external device 26 may be a torque generating part capable of generating a rotational torque to be imparted to the input/output shaft 28 serving as the input shaft. In contrast, when the rotary electric machine 1 functions as the electric motor, the external device 26 may be a driven part to receive a rotational torque from the input/output shaft 28 serving as the output shaft.

The coupling device 30 may be configured to be able to transmit a torque from at least one of the rotor 20 or the input/output shaft 28 to the other. Here, the coupling device 30 according to the present disclosure is configured to allow misalignment between the rotor 20 and the input/output shaft 28. More specifically, in addition to being able to transmit a rotational force between the rotor 20 and the input/output shaft 28, the coupling device 30 is configured to absorb displacement such as angle fluctuation when the relative angle or the relative position of the axis of each of the rotor 20 and the input/output shaft 28 is not constant but fluctuates due to oscillation of the rotor 20 or the input/output shaft 28, for instance, and various forms of coupling (universal joint) can be applied to the coupling device 30. For instance, the coupling device 30 may be configured to transmit a torque between the input/output shaft 28 and the rotor 20 by engaging an external tooth disposed around at least a part or all of the circumference of the input/output shaft 28 with an internal tooth disposed on the inner peripheral surface of the rotor 20 so as to face the external tooth. In this case, for instance, a flexible member (e.g., resin) may be interposed between the external tooth and the internal tooth to absorb a change in relative angle of the axis of each of the rotor 20 and the input/output shaft 28 and misalignment between the input/output shaft 28 and the rotor 20 in the radial direction.

Further, the coupling device 30 may have a diaphragm coupling structure (not shown) that can absorb a change in relative angle of the axis of each of the rotor 20 and the input/output shaft 28, for instance.

As described above, as long as the coupling device 30 is disposed closer to the second end of the input/output shaft 28 than the end 20B of the rotor 20 is in the extension direction of the input/output shaft 28, the coupling device 30 may be disposed between the first end 28A and the second end 28B of the input/output shaft 28 or may be disposed at the second end 28B.

Thus, in some embodiments of the present disclosure, at least a part or the whole of the coupling structure including the input/output shaft 28 and the coupling device 30 is disposed so as to extend in the central space 20A of the rotor 20.

Figure 5:
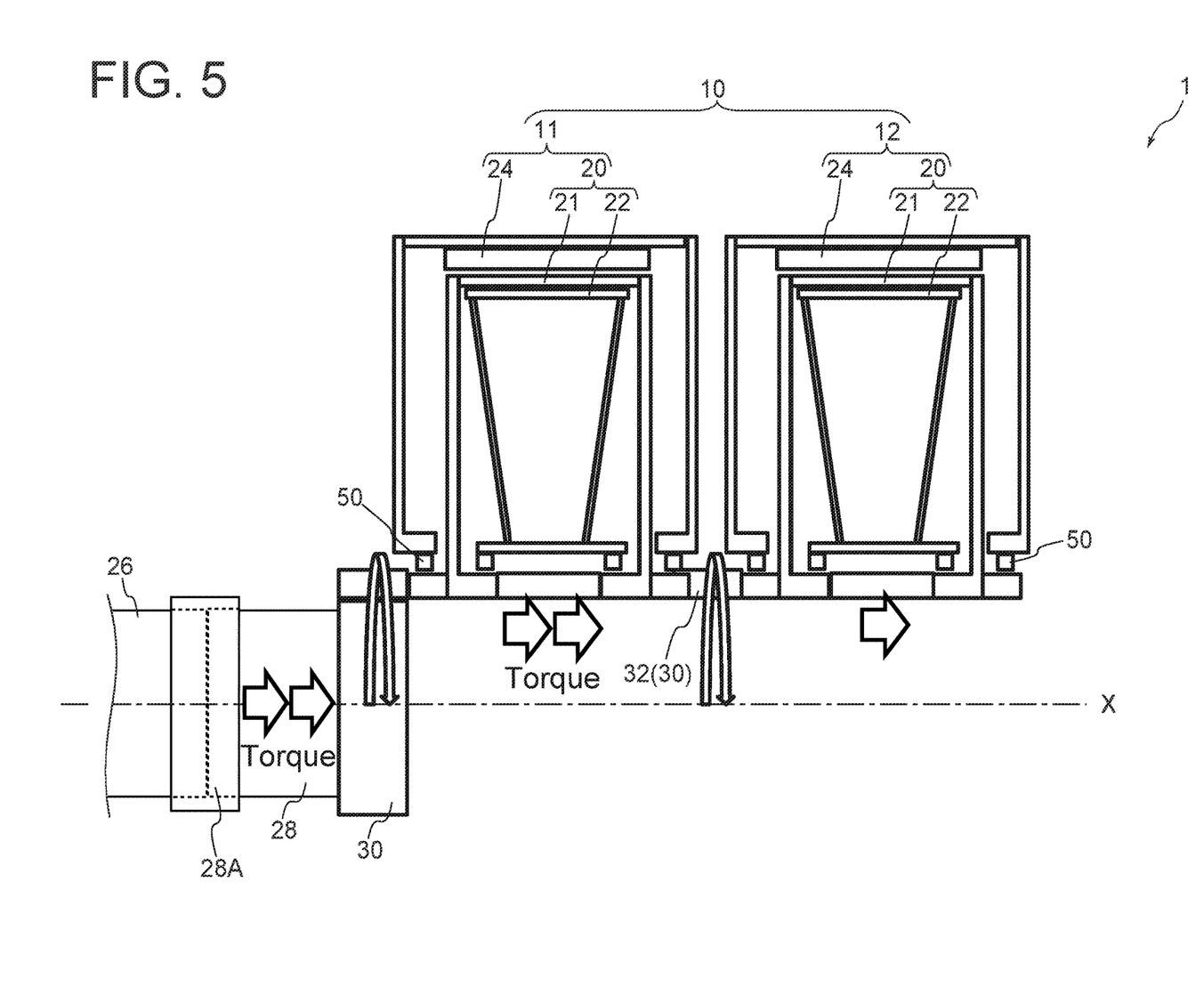
FIG. 5 is a cross-sectional side view schematically showing a configuration of a rotary electric machine according to a comparative example.

If the input/output shaft 28 and the rotor 20 are coupled at a position closer to the external device 26 than the end 20B of the rotor 20 adjacent to the external device 26 is (for instance, see FIG. 5 schematically showing a rotary electric machine according to a comparative example), a space for installing the entire rotary electric machine 1 including the rotor 20, the input/output shaft 28, and the coupling device 30 is elongated in the axial direction, and the size of entire rotary electric machine 1 is increased in the axial direction.

In this regard, with the above configuration, since the input/output shaft 28 for transmitting a torque to the rotor 20 via the coupling device 30 extends in the central space 20A of the rotor 20 along the axial direction, it is possible to make use of the central space 20A of the rotor 20 in an extension range of the rotor 20 in the axial direction. Thus, it is possible to reduce the size of the rotary electric machine 1 in the axial direction, and it is possible to generate a larger electric power or a larger torque when the same space in the axial direction is used.

Further, since the input/output shaft 28 and the rotor 20 are coupled by the coupling device 30 at a position farther away from the external device 26 than the end 20B of the rotor 20 adjacent to the external device 26 toward the second end of the input/output shaft 28 in the axial direction, it is possible to secure a long axial span of the input/output shaft 28, i.e., a long distance from the external device 26 to the coupling device 30 while controlling the axial dimension of the entire rotary electric machine 1, compared with the case where the input/output shaft 28 and the rotor 20 are coupled at a position closer to the external device 26 than the end 20B of the rotor 20 adjacent to the external device 26 is, for instance. Thus, even if the external device 26 is displaced (for instance, in the radial direction of the input/output shaft 28), misalignment angle of the input/output shaft 28 in the coupling device 30 is reduced. Thus, it is possible to provide the rotary electric machine 1 with an improved robust against the displacement of the external device 26.

Accordingly, it is possible to accomplish both the increase in generation of power or torque and the improvement in durability of the device without upsizing the device.

Figure 2:
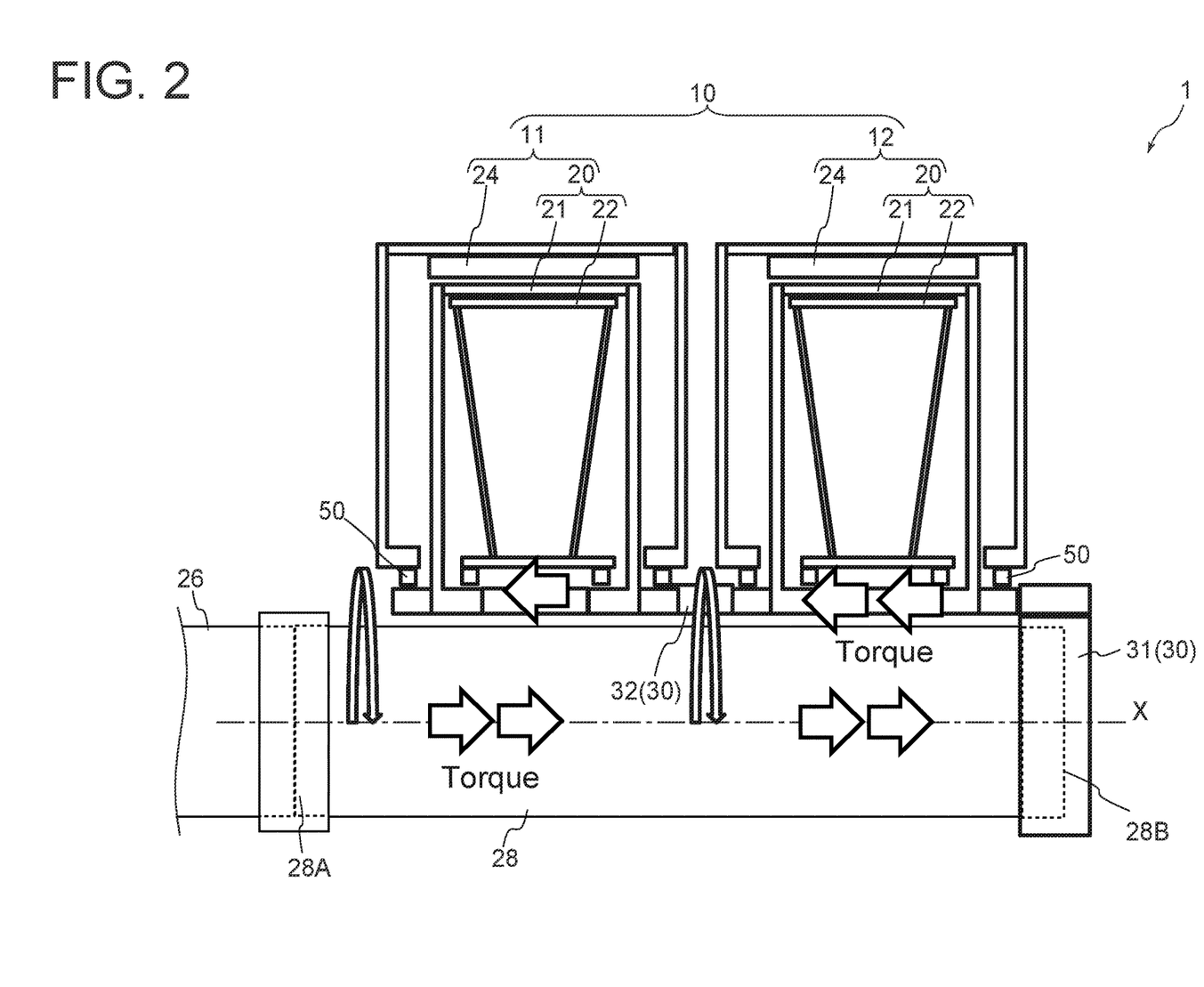
FIG. 2 is a cross-sectional side view schematically showing a configuration of a rotary electric machine according to an embodiment.
Figure 3:
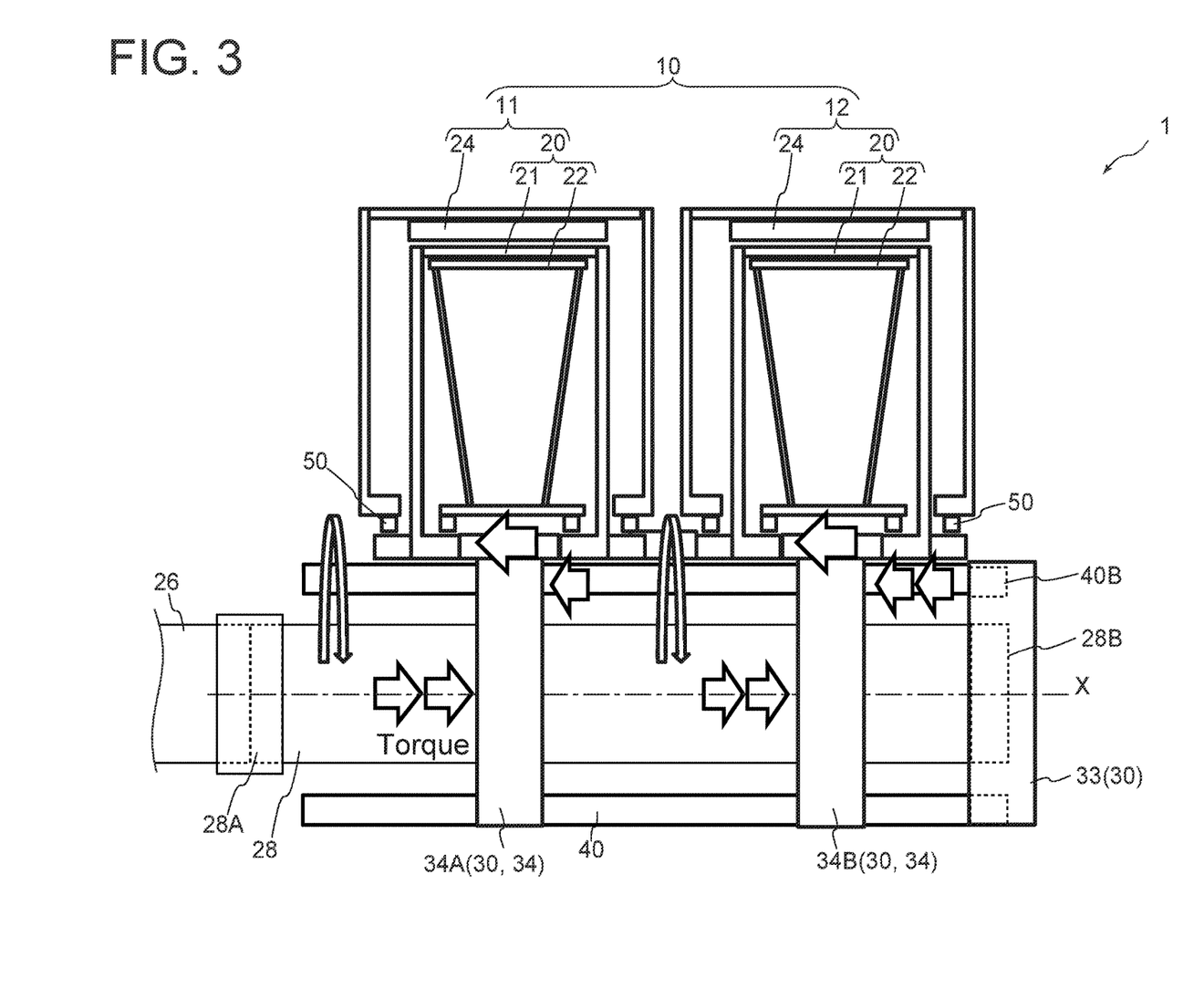
FIG. 3 is a cross-sectional side view schematically showing a configuration of a rotary electric machine according to another embodiment.

FIG. 2 is a cross-sectional side view schematically showing a configuration of a rotary electric machine according to an embodiment. FIG. 3 is a cross-sectional side view schematically showing a configuration of a rotary electric machine according to another embodiment. In FIGS. 2 and 3 and FIGS. 4 and 5 described later, for simplicity of description, a configuration of only one side (half) of the rotary electric machine 1 about the axis X is mainly shown.

In some embodiments, for instance as illustrated in FIGS. 1 to 3, the coupling device 30 may connect the second end 28B of the input/output shaft 28 and the rotor 20 so as to be able to transmit a torque.

With the configuration in which the coupling device 30 is disposed at the second end 28B of the input/output shaft 28, it is possible to secure a long dimension of the input/output shaft 28 in the axial direction, i.e., a long distance from the external device 26 to the coupling device 30, compared with the case where the coupling device 30 is disposed at a position other than the second end 28B of the input/output shaft 28. Thus, when the external device 26 is displaced, the rotary electric machine 1 in this form can reduce misalignment angle of the input/output shaft 28 in the coupling device 30, compared with the case where the input/output shaft 28 and the rotor 20 are coupled at a position closer to the external device 26 than the end 20B of the rotor 20 adjacent to the external device 26 is. Thus, since the load on the coupling device 30 due to the displacement of the external device 26 is reduced, it is possible to provide the rotary electric machine 1 with an improved robust against the displacement of the external device 26.

Figure 4:
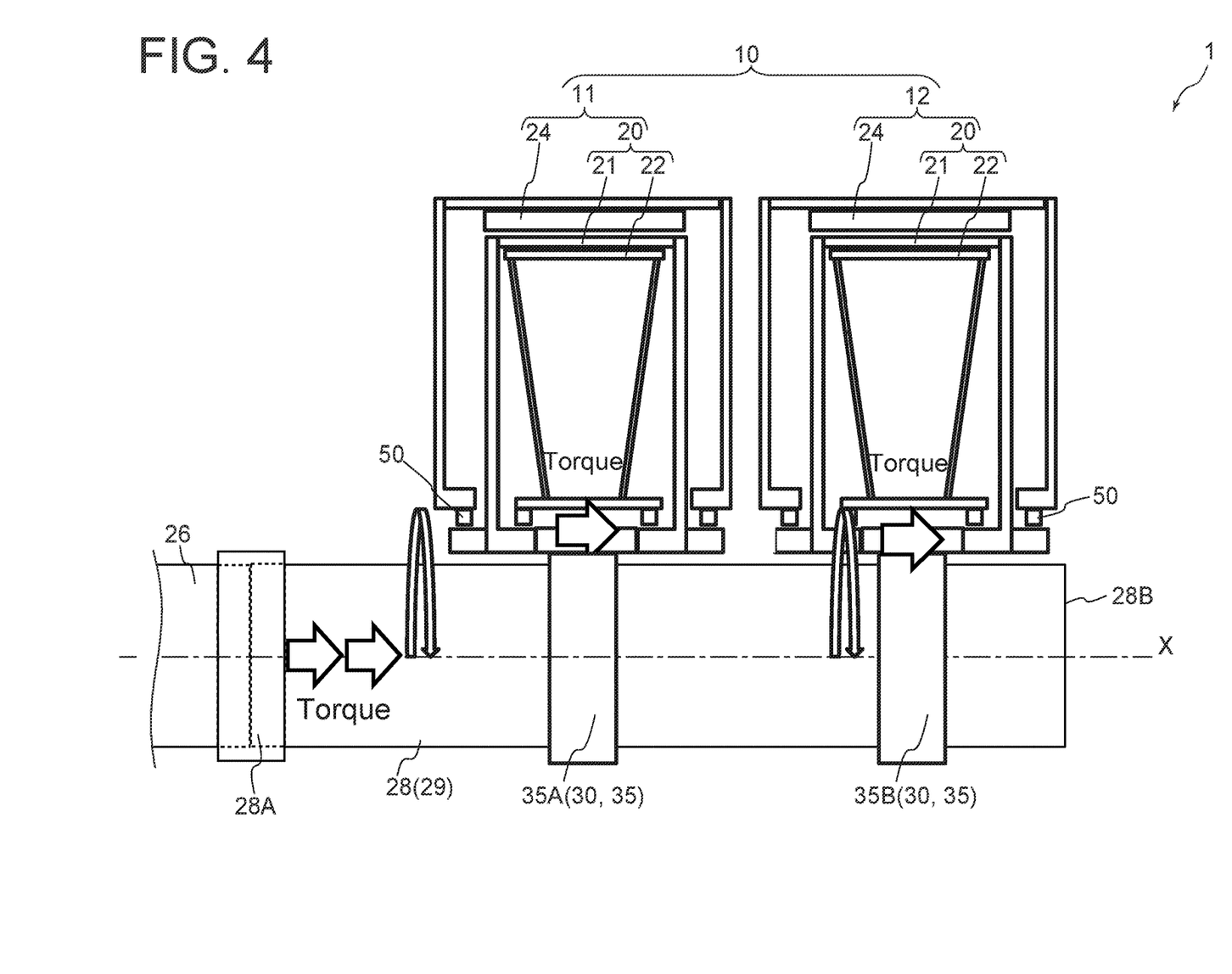
FIG. 4 is a cross-sectional side view schematically showing a configuration of a rotary electric machine according to another embodiment.

FIG. 4 is a cross-sectional side view schematically showing a configuration of a rotary electric machine according to another embodiment.

In some embodiments, for instance as illustrated in FIGS. 1 to 4, the rotor 20 may include a low-speed rotor 21 including an inner ring portion 21A, an outer ring portion 21B disposed on the radially outer side of the inner ring portion 21A, a radially extending portion 21C connecting the inner ring portion 21A and the outer ring portion 21B, and a high-speed rotor 22 disposed between the inner ring portion 21A and the outer ring portion 21B and rotatable about the axis X independently from the low-speed rotor 21.

The low-speed rotor 21 may be supported by the stator 24 (for instance, the inner peripheral surface thereof) via a bearing 50 so as to be rotatable relative to the stator 24. The low-speed rotor 21 may be formed by integrally connecting the inner ring portion 21A, the outer ring portion 21B, and the radially extending portion 21C. For instance, the low-speed rotor 21 may be formed by connecting or bending iron bars or plates in a basket shape.

The high-speed rotor 22 may be housed in a space of the basket surrounded by the inner ring portion 21A, the outer ring portion 21B, and the radially extending portion 21C of the low-speed rotor 21. In other words, the high-speed rotor 22 may be an annular basket-like body formed slightly smaller in the radial direction and the axial direction than the low-speed rotor 21. For instance, the high-speed rotor 22 may be formed by connecting or bending iron bars or plates in a basket shape. The high-speed rotor 22 may be supported by the low-speed rotor 21 (for instance, the outer peripheral surface of the inner ring portion 21A) via a bearing so as to be rotatable relative to the low-speed rotor 21 and the stator 24.

With the configuration in which the rotor 20 includes the low-speed rotor 21 and the high-speed rotor 22, it is possible to provide the rotary electric machine 1 (for instance, a so-called magnetic geared generator in the case where the rotary electric machine 1 functions as the generator) that can produce a higher output than the rotary electric machine including the armature unit 10 not having the high-speed rotor 22. Thus, it is possible to provide the rotary electric machine 1 that can suppress upsizing in the axial direction and/or the radial direction for a higher output, and can achieve downsizing for an equivalent output, compared with the rotary electric machine not having the high-speed rotor 22.

In some embodiments, the armature unit 10 may include a plurality of armature units 10 arranged along the axial direction.

More specifically, for instance as illustrated in FIGS. 2 to 4, the armature unit 10 may include a first armature unit 11 and a second armature unit 12 arranged in the axial direction. In this disclosure, in the case where the armature unit 10 includes a plurality of armature units 10, the armature units 10 are referred to as the first armature unit 11, the second armature unit 12, . . . , in the order of proximity to the external device 26.

Each armature unit 11, 12 may have the same or similar configuration as that of the armature unit 10 described in any of embodiments of this disclosure.

Although in the examples shown in FIGS. 2 to 4, the rotary electric machine 1 including two armature units 11, 12 along the axis X direction is shown, the number of the armature units 10 included in the rotary electric machine 1 is not limited to two, and three or more armature units 10 may be included, for instance.

In the case where the rotary electric machine 1 includes a plurality of (two or more) armature units 10, as well as the embodiments illustrated in FIGS. 2 to 4, each armature unit 10 may be connected in series so that the rotor 20 (or low-speed rotor 21) of each armature unit 10 is able to transmit a torque to the rotor 20 (or low-speed rotor 21) of its axially adjacent armature unit 10. Alternatively, the rotor 20 of each armature unit 10 may be configured so as be able to transmit a torque to the same shaft, including the input/output shaft 28 or a shaft (e.g., hollow shaft 40 described later) rotatable together with the input/output shaft 28.

With the configuration including the plurality of armature units 10 (e.g., first armature unit 11 and second armature unit 12) arranged along the axial direction, it is possible to increase the output of the rotary electric machine 1 without upsizing the armature unit 10 in the radial direction.

In some embodiments, the rotary electric machine 1 may include a plurality of armature units 10 arranged along the axial direction, and the input/output shaft 28 may extend so as to traverse the central space 20A of the rotor 20 of each of the plurality of armature units 10. In this case, the coupling device 30 may include a first coupling 31 connecting the second end 28B of the input/output shaft 28 and the rotor 20 of the armature unit 10 that is farthest from the external device 26, and at least one second coupling 32 connecting the rotors 20 of two adjacent armature units 10 so as to be able to transmit a torque.

More specifically, for instance as illustrated in FIG. 2, the input/output shaft 28 may extend so as to traverse the central space 20A of the rotor 20 of the first armature unit 11 and the central space 20A of the rotor 20 of the second armature unit 12. In this case, the coupling device 30 may include a first coupling 31 connecting the second end 28B of the input/output shaft 28 and the rotor 20 of the second armature unit 12, and a second coupling 32 connecting the rotor 20 of the first armature unit 11 and the rotor 20 of the second armature unit 12.

The input/output shaft 28 passes through at least the central space 20A of the rotor 20 of the first armature unit 11 in the axis X direction. The input/output shaft 28 may pass through the central spaces 20A of both the armature units 11, 12 so that the second end 28B of the input/output shaft 28 is aligned with or protrude from an end opposite to the end 20B of the rotor 20 of the second armature unit 12 in the axial direction. However, the input/output shaft 28 may be disposed so that the second end 28B thereof is positioned inside the central space 20A of the rotor 20 of the second armature unit 12.

In other words, the input/output shaft 28 may pass through the central spaces 20A of all the armature units 10 in the axis X direction so that it is aligned with or protrudes from an end, away from the external device 26, of the rotor 20 of the armature unit 10 farthest from the external device 26 among the plurality of armature units 10. Alternatively, the input/output shaft 28 may be disposed so that the end 28B thereof passes through at least the central space 20A of the rotor 20 of the armature unit 10 other than the armature unit 10 farthest from the external device 26 among the plurality of armature units 10 and is positioned inside the central space 20A of the rotor 20 of the armature unit 10 farthest from the external device 26.

The first coupling 31 may connect the rotor 20 of the armature unit 10 (e.g., second armature unit 12 in the case of FIG. 2) farthest from the external device 26 among the plurality of armature units 10 and the second end 28B of the input/output shaft 28 so as to be able to transmit a torque.

The second coupling 32 connects the rotors 20 of two axially adjacent armature units 10 so as to be able to transmit a torque. Accordingly, in the rotary electric machine 1 including two or more (N-numbered) armature units 10, one second coupling 32 is disposed between the rotors 20 of two adjacent armature units 10, so that "N−1" second couplings 32 are provided in total.

With the configuration including the input/output shaft 28 extending so as to traverse the central spaces 20A of the rotors 20 of the plurality of armature units 10 arranged in the axis X direction, the first coupling 31, and at least one second coupling 32, it is possible to secure the dimension of the input/output shaft 28 in the axial direction as long as possible in a configuration including a necessary number of armature units 10 for producing desired output. Accordingly, it is possible to significantly reduce misalignment angle of the input/output shaft 28 in the coupling device 30. Thus, since the load on the coupling device 30 due to the displacement of the external device 26 is significantly reduced, it is possible to provide the rotary electric machine 1 with an improved robust against the displacement of the external device 26.

In some embodiments, the rotary electric machine 1 may include a plurality of armature units 10 arranged along the axial direction, and a hollow shaft 40 disposed outside the input/output shaft 28 and inside the rotor 20 in the radial direction of the input/output shaft 28. In this case, the input/output shaft 28 and the hollow shaft 40 may together extend so as to traverse the central space 20A of the rotor 20 of each of the plurality of armature units 10. Further, in this case, the coupling device 30 may include a third coupling 33 connecting the second end 28B of the input/output shaft 28 and an end 40B of the hollow shaft 40 adjacent to the second end 28B, and a plurality of fourth coupling 34 connecting the rotor 20 of each of the plurality of armature units 10 and the hollow shaft 40 individually.

More specifically, for instance as illustrated in FIG. 3, the rotary electric machine 1 may include the hollow shaft 40 disposed outside the input/output shaft 28 and inside the rotor 20 in the radial direction of the input/output shaft 28, and the input/output shaft 28 and the hollow shaft 40 may together extend so as to traverse the central space 20A of the rotor 20 of the first armature unit 11 and the central space 20A of the rotor 20 of the second armature unit 12. In this case, the coupling device 30 may include the third coupling 33, a fourth coupling 34A connecting the rotor 20 of the first armature unit 11 and the hollow shaft 40, and a fourth coupling 34B connecting the rotor 20 of the second armature unit 12 and the hollow shaft 40.

The hollow shaft 40 passes through at least the central space 20A of the rotor 20 of the first armature unit 11 in the axis X direction. The hollow shaft 40 may pass through the central spaces 20A of both the armature units 11, 12 so that the end 40B of the hollow shaft 40 is aligned with or protrude from an end opposite to the end 20B of the rotor 20 of the second armature unit 12 in the axial direction. However, hollow shaft 40 may be disposed so that the end 40B thereof is positioned inside the central space 20A of the rotor 20 of the second armature unit 12.

The end 40B of the hollow shaft 40 may be aligned with the second end 28B of the input/output shaft 28.

The third coupling 33 may be configured to transmit a torque between the input/output shaft 28 and the hollow shaft 40 by engaging an external tooth disposed at the second end 28B of the input/output shaft 28 around at least a part or all of the circumference with an internal tooth disposed on the inner peripheral surface of the hollow shaft 40 so as to face the external tooth.

The fourth coupling 34 (e.g., fourth coupling 34A and fourth coupling 34B) may be configured to transmit a torque between the hollow shaft 40 and the rotor 20 by engaging an external tooth disposed on the outer peripheral surface of the hollow shaft 40 around at least a part or all of the circumference with an internal tooth disposed on the inner peripheral surface of the rotor 20 (or low-speed rotor 21) so as to face the external tooth.

With the configuration including the input/output shaft 28 extending so as to traverse the central spaces 20A of the rotors 20 of the plurality of armature units 10 arranged in the axis X direction, the third coupling 33, and the plurality of fourth coupling 34, it is possible to secure the dimension of the input/output shaft 28 in the axial direction as long as possible in a configuration including a necessary number of armature units 10 for producing desired output. Accordingly, it is possible to significantly reduce misalignment angle of the input/output shaft 28 in the coupling device 30. Thus, since the load on the coupling device 30 due to the displacement of the external device 26 is significantly reduced, it is possible to provide the rotary electric machine 1 with an improved robust against the displacement of the external device 26. Further, since a torque is individually transmitted between each of the rotors 20 and the hollow shaft 40 via the plurality of fourth coupling 34 provided for the respective rotors 20, it is possible to equalize the torque transmitted between each rotor 20 and the hollow shaft 40.

In some embodiments, the rotary electric machine 1 may include a plurality of armature units 10 arranged along the axial direction, and the input/output shaft 28 may extend so as to traverse the central space 20A of the rotor 20 of each of the plurality of armature units 10. In this case, the coupling device 30 may include a plurality of fifth couplings 35 individually connecting the rotor 20 of each of the plurality of armature units 10 and the input/output shaft 28.

More specifically, for instance as illustrated in FIG. 4, the input/output shaft 28 may extend so as to traverse the central space 20A of the rotor 20 of the first armature unit 11 and the central space 20A of the rotor 20 of the second armature unit 12, and the coupling device 30 may include a fifth coupling 35A connecting the rotor 20 of the first armature unit 11 and the input/output shaft 28, and a fifth coupling 35B connecting the rotor 20 of the second armature unit 12 and the input/output shaft 28.

The input/output shaft 28 passes through at least the central space 20A of the rotor 20 of the first armature unit 11 in the axis X direction. The input/output shaft 28 may pass through the central spaces 20A of both the armature units 11, 12 so that the second end 28B of the input/output shaft 28 is aligned with or protrude from an end opposite to the end 20B of the rotor 20 of the second armature unit 12 in the axial direction. However, the input/output shaft 28 may be disposed so that the second end 28B thereof is positioned inside the central space 20A of the rotor 20 of the second armature unit 12.

In other words, the input/output shaft 28 may pass through the central spaces 20A of all the armature units 10 in the axis X direction so that it is aligned with or protrudes from an end, away from the external device 26, of the rotor 20 of the armature unit 10 farthest from the external device 26 among the plurality of armature units 10. Alternatively, the input/output shaft 28 may be disposed so that the end 28B thereof passes through at least the central space 20A of the rotor 20 of the armature unit 10 other than the armature unit 10 farthest from the external device 26 among the plurality of armature units 10 and is positioned inside the central space 20A of the rotor 20 of the armature unit 10 farthest from the external device 26.

The fifth coupling 35 (e.g., fifth coupling 35A and fifth coupling 35B) may be configured to transmit a torque between the input/output shaft 28 and the rotor 20 by engaging an external tooth disposed on the outer peripheral surface of the input/output shaft 28 around at least a part or all of the circumference with an internal tooth disposed on the inner peripheral surface of the rotor 20 (or low-speed rotor 21) so as to face the external tooth.

With the configuration including the input/output shaft 28 extending so as to traverse the central spaces 20A of the rotors 20 of the plurality of armature units 10 arranged in the axis X direction and the plurality of fifth coupling 35, it is possible to equalize the torque transmitted between each rotor 20 and the input/output shaft 28 in a configuration including a necessary number of armature units 10 for producing desired output.

A generator according to at least one embodiment of the present disclosure includes an armature unit 10 including an annular rotor 20 configured to be rotatable around the axis and a stator 24 disposed on the radially outer side of the rotor 20, an input shaft 29 (input/output shaft 28) coupled at a first end to an external device 26 which is a torque generating part and extending along the axial direction of the rotor 20 in a central space 20A formed in a central portion of the rotor 20, and a coupling device 30 disposed farther away from the torque generating part than an end 20B of the rotor 20 adjacent to the torque generating part in the axial direction and connecting the input shaft 29 and the rotor 20 so as to be able to transmit a torque.

With the generator having the above configuration, since the coupling device 30 for transmitting a torque from the rotor 20 to the input shaft 29 is disposed on the input shaft 29 extending along the axial direction in the central space 20A of the rotor 20, it is possible to make use of a space inside the rotor 20 in an extension range of the rotor 20 in the axial direction. Thus, it is possible to reduce the size of the generator in the axial direction. Further, since the input shaft 29 and the rotor 20 are coupled by the coupling device 30 at a position farther away from the torque generating part than the end of the rotor 20 adjacent to the torque generating part in the axial direction, it is possible to secure a long span of the input shaft 29, i.e., a long distance from the torque generating part to the coupling device 30, compared with the case where the input shaft 29 and the rotor 20 are coupled at a position closer to the torque generating part than the end 20B of the rotor 20 adjacent to the torque generating part is, for instance. Thus, even if the torque generating part is displaced, misalignment angle of the input shaft 29 in the coupling device 30 is reduced. Thus, it is possible to provide the generator with an improved robust against the displacement of the torque generating part.

Figure 6:
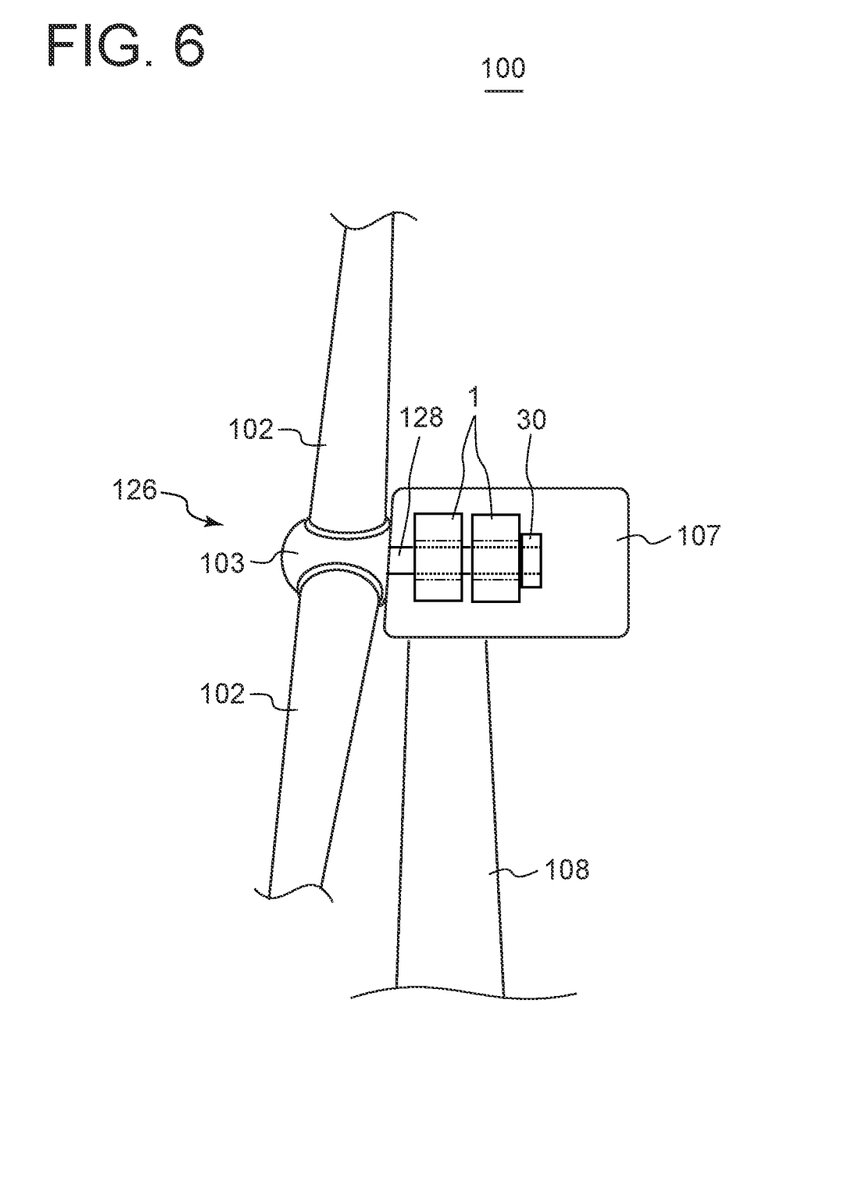
FIG. 6 is a schematic configuration diagram of a wind turbine power generation facility according to an embodiment of the present invention.

FIG. 6 is a schematic configuration diagram of a wind turbine power generation facility according to an embodiment of the present invention.

A wind turbine power generation facility (hereinafter, referred to as wind turbine 100) according to at least one embodiment of the present invention includes, for instance as illustrated in FIG. 6, the rotary electric machine 1 as the generator described in any one of the embodiments described above and a wind turbine rotor 126 as the external device 26 for imparting a rotational force to the rotary electric machine 1. Further, the wind turbine 100 includes a nacelle 107 rotatably supporting the wind turbine rotor 126, a tower 108 pivotably supporting the nacelle 107, and a base (not shown) on which the tower 108 is installed.

The rotary electric machine 1 is disposed in the nacelle 107 as the generator for converting rotational energy of the wind turbine rotor 126 into electrical energy.

The wind turbine rotor 126 includes at least one (e.g., three) wind turbine blade 102 and a hub 103 to which the wind turbine blade 102 is attached, and is rotatably supported by the nacelle 107 via a main shaft 128 as the input/output shaft 28 (or input shaft 29) coupled to the hub 103 so as to be rotatable with the hub 103. In other words, the wind turbine rotor 126 is coupled to an end of the main shaft 128, i.e., the first end 28A of the input/output shaft 28 of the rotary electric machine 1, via the hub 103. Further, a rotational torque generated by the wind turbine rotor 126 upon receiving natural energy of wind is input into the rotary electric machine 1 via the input/output shaft 28 functioning as the input shaft 29.

In the wind power generation, due to a recent demand for an increase in power generation output, the turbine, that is, the wind turbine rotor 126 has a tendency to increase in diameter. As a result, the onshore height or the offshore height of the nacelle 107 at which the generator is installed tends to increase. In response to this, the generator is desired to be reduced in size (or suppress upsizing), in terms of workability in transferring in and out of the nacelle 107. Further, the wind turbine rotor 126, which is the torque generating part, may be displaced in various directions depending on wind load.

In this regard, with the wind turbine 100 including the rotary electric machine 1 having any one of the above configurations as the generator, since the input/output shaft 28 (main shaft 128) for transmitting a torque to the rotor 20 via the coupling device 30 extends in the central space 20A of the rotor 20 along the axial direction, it is possible to make use of the central space 20A of the rotor 20 in an extension range of the rotor 20 in the axial direction. Thus, it is possible to reduce the size of the rotary electric machine 1 in the axial direction, and it is possible to generate a larger electric power when the same space in the axial direction is used.

Further, since the input/output shaft 28 and the rotor 20 are coupled by the coupling device 30 at a position farther away from the wind turbine rotor 126 (external device 26) than the end 20B of the rotor 20 adjacent to the wind turbine rotor 126 in the axial direction, it is possible to secure a long span of the input/output shaft 28, i.e., a long distance from the wind turbine rotor 126 to the coupling device 30, compared with the case where the input/output shaft 28 and the rotor 20 are coupled at a position closer to the wind turbine rotor 126 than the end 20B of the rotor 20 adjacent to the wind turbine rotor 126 (see FIG. 5 schematically showing a rotary electric machine according to a comparative example, for instance). Thus, even if the wind turbine rotor 126 is displaced (for instance, in the radial direction of the input/output shaft 28), misalignment angle of the input/output shaft 28 in the coupling device 30 is reduced. Thus, it is possible to provide the rotary electric machine 1 (generator) with an improved robust against the displacement of the wind turbine rotor 126.

Accordingly, it is possible to provide the wind turbine 100 that can accomplish both the increase in generation of power and the improvement in durability of the device without upsizing the device.

Embodiments of the present invention were described in detail above, but the present invention is not limited thereto, and various amendments and modifications may be implemented.

For instance, although the above examples were mainly described in connection with the case where the rotary electric machine 1 is the generator, the rotary electric machine 1 may be an electric motor.

An electric motor according to at least one embodiment of the present invention includes an armature unit 10 including an annular rotor 20 configured to be rotatable around the axis and a stator 24 disposed on the radially outer side of the rotor 20, an output shaft (input/output shaft 28) coupled at a first end 28A to an external device 26 which is a driven part and extending along the axial direction of the rotor 20 in a central space 20A formed in a central portion of the rotor 20, and a coupling device 30 disposed farther away from the driven part than an end 20B of the rotor 20 adjacent to the driven part in the axial direction and connecting the output shaft and the rotor 20 so as to be able to transmit a torque.

With the electric motor having the above configuration, since the coupling device 30 for transmitting a torque from the rotor 20 to the output shaft is disposed on the output shaft extending along the axial direction in the central space 20A of the rotor 20, it is possible to make use of a space inside the rotor 20 in an extension range of the rotor 20 in the axial direction. Thus, it is possible to reduce the size of the electric motor in the axial direction. Further, since the output shaft and the rotor 20 are coupled by the coupling device 30 at a position farther away from the driven part than the end 20B of the rotor 20 adjacent to the driven part in the axial direction, it is possible to secure a long span of the output shaft, i.e., a long distance from the driven part to the coupling device 30, compared with the case where the output shaft and the rotor 20 are coupled at a position closer to the driven part than the end 20B of the rotor 20 adjacent to the driven part is, for instance. Thus, even if the driven part is displaced, misalignment angle of the output shaft in the coupling device 30 is reduced. Thus, it is possible to provide the electric motor with an improved robust against the displacement of the driven part.

Further, the rotary electric machine 1 may be mounted on the wind turbine 100 as the generator, or may be connected to a space-constrained device having a shaft rotating at low speed, for instance. Examples of such a device include an electric motor for rotating work rolls of a rolling mill in the field of iron manufacturing machine.

The rolling mill sandwiches a metal plate between two work rolls arranged to face each other, passes the metal plate by rotation of the rolls, and stretches and rolls the metal plate into a strip or a plate material. In such a rolling mill, the center distance between the two rolls needs to be changed for changing the thickness of the metal plate to be processed or for maintenance of the device. Therefore, the rotary electric machine 1 according to the present disclosure can be used as the electric motor that can follows the change in center distance between the rolls.

The invention claimed is:
1. A rotary electric machine comprising:
a first armature unit including a first annular rotor configured to be rotatable around an axis and a first stator disposed on a radially outer side of the first annular rotor;
a second armature unit including a second annular rotor configured to be rotatable around the axis and a second stator disposed on a radially outer side of the second annular rotor;
an input or output shaft coupled at a first end thereof to an external device and extending along an axial direction of the first annular rotor and the second annular rotor so as to traverse a first central space defined in a first central portion of the first annular rotor and a second central space defined in a second central portion of the second annular rotor; and a coupling device disposed closer to a second end of the input or output shaft than an end of the first annular rotor adjacent to the external device in the axial direction of the first annular rotor and the second annular rotor, the coupling device connecting the input or output shaft with the first annular rotor and the second annular rotor so as to be able to transmit a torque, wherein the second armature unit is disposed farther away from the external device than the first armature unit in the axial direction of the first annular rotor and the second annular rotor, and wherein the coupling device includes:
a first coupling connecting the second end of the input or output shaft and the second annular rotor; and
a second coupling connecting the first annular rotor and the second annular rotor.

2. The rotary electric machine according to claim 1, wherein the rotary electric machine is a generator, wherein the input or output shaft is an input shaft, wherein the external device is a torque generation part.

3. A wind turbine power generation facility comprising: the rotary electric machine according to claim 1; and a wind turbine rotor for imparting a rotational force to the rotary electric machine.

4. A rotary electric machine comprising:
a first armature unit including a first annular rotor configured to be rotatable around an axis and a first stator disposed on a radially outer side of the first annular rotor;
a second armature unit including a second annular rotor configured to be rotatable around the axis and a second stator disposed on a radially outer side of the second annular rotor;
an input or output shaft coupled at a first end thereof to an external device and extending along an axial direction of the first annular rotor and the second annular rotor so as to traverse a first central space defined in a first central portion of the first annular rotor and a second central space defined in a second central portion of the second annular rotor; and
a coupling device disposed closer to a second end of the input or output shaft than an end of the first annular rotor adjacent to the external device in the axial direction of the first annular rotor and the second annular rotor, the coupling device connecting the input or output shaft with the first annular rotor and the second annular rotor so as to be able to transmit a torque, wherein the second armature unit is disposed farther away from the external device than the first armature unit in the axial direction of the first annular rotor and the second annular rotor, wherein the rotary electric machine includes a hollow shaft disposed outside the input or output shaft and inside the first annular rotor and the second annular rotor in a radial direction of the input or output shaft, wherein the input or output shaft and the hollow shaft together extend so as to traverse the first central space and the second central space, and wherein the coupling device includes:
a first coupling connecting the second end of the input or output shaft and the hollow shaft;
a second coupling connecting the first annular rotor and the hollow shaft; and
a third coupling connecting the second annular rotor and the hollow shaft.

5. A rotary electric machine comprising:
an armature unit including an annular rotor configured to be rotatable around an axis and a stator disposed on a radially outer side of the annular rotor;
an input or output shaft coupled at a first end thereof to an external device and extending along an axial direction of the annular rotor in a central space defined in a central portion of the annular rotor; and
a coupling device disposed closer to a second end of the input or output shaft than an end of the annular rotor adjacent to the external device in the axial direction of the annular rotor, the coupling device connecting the input or output shaft and the annular rotor so as to be able to transmit a torque, wherein the annular rotor includes:
a first rotor including an inner ring portion, an outer ring portion disposed on a radially outer side of the inner ring portion, and a radially extending portion connecting the inner ring portion and the outer ring portion; and
an annular second rotor disposed between the inner ring portion and the outer ring portion and rotatable around the axis independently from the first rotor.

6. The rotary electric machine according to claim 5, wherein the annular second rotor is configured to rotate at a higher speed than the first rotor.

* * * * *